United States Patent Office 3,077,817
Patented Feb. 19, 1963

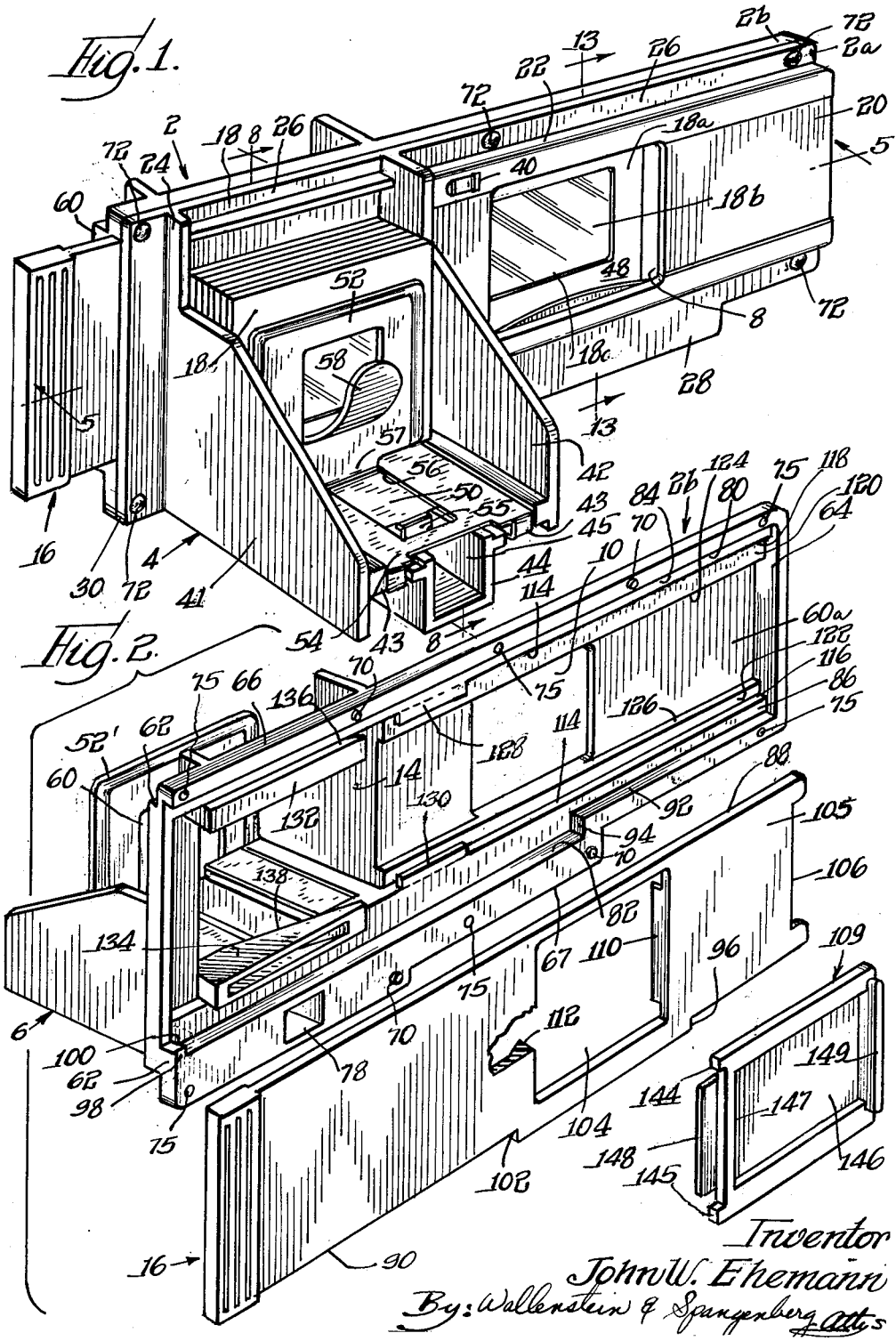

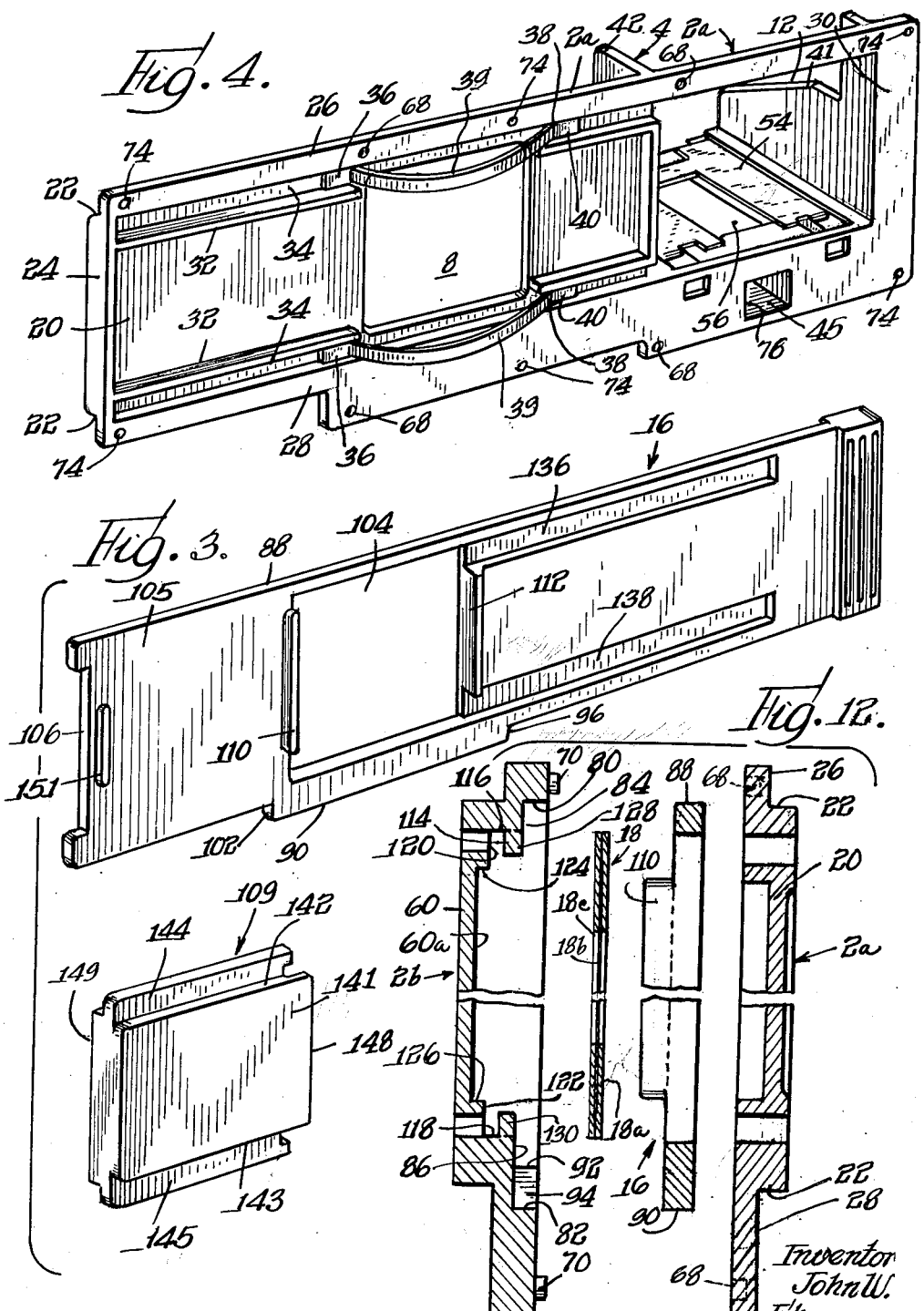

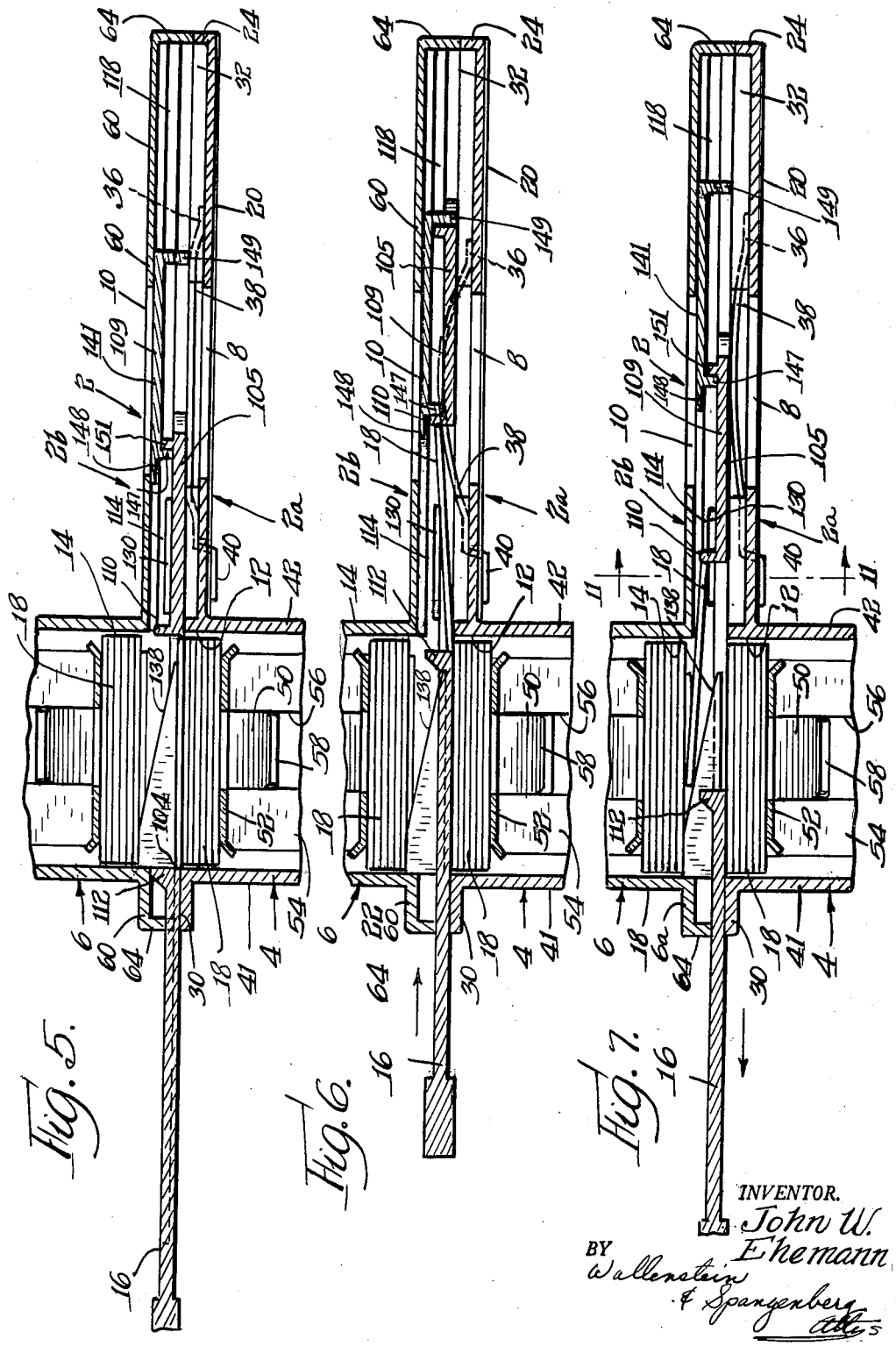

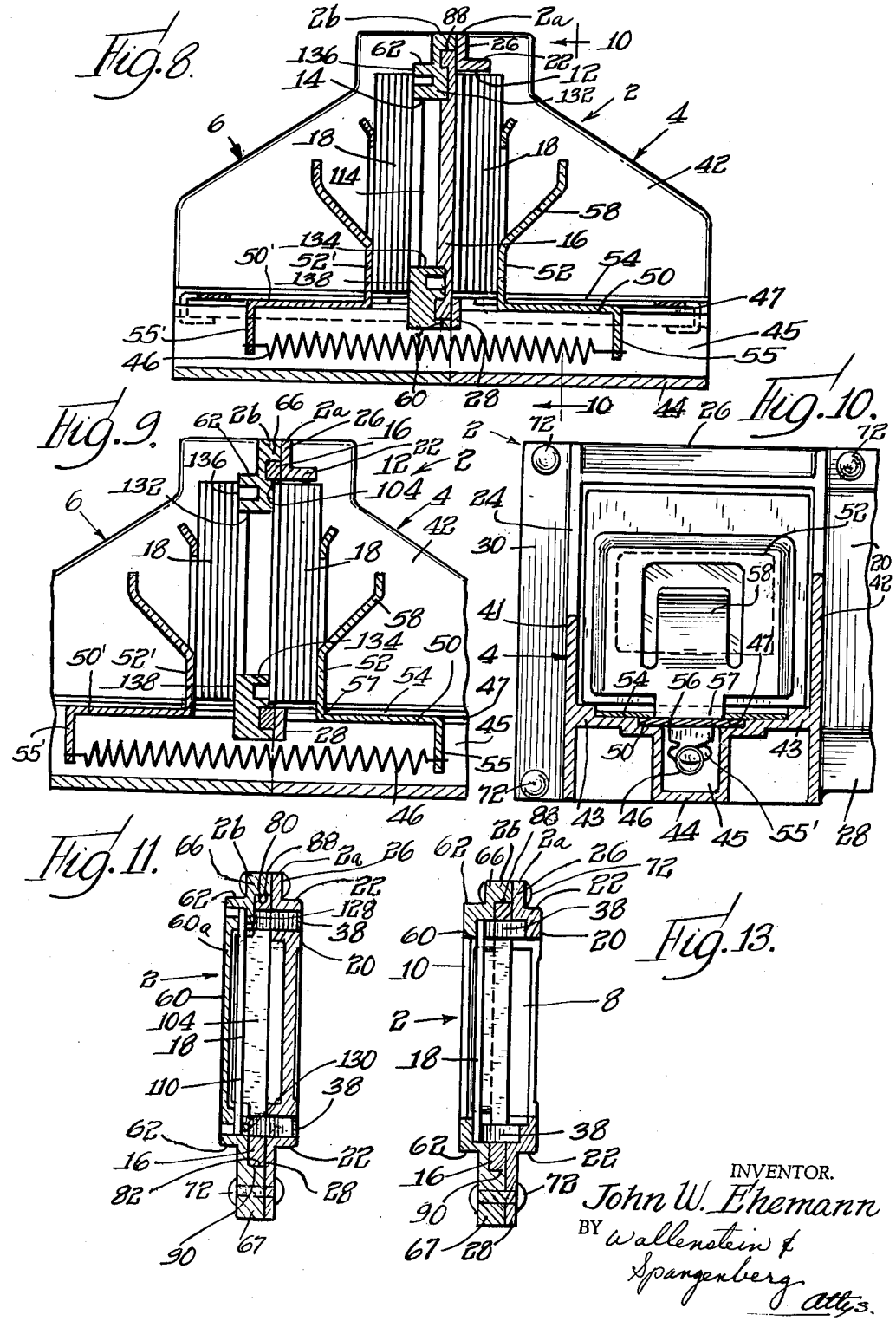

3,077,817
SLIDE CHANGER
John W. Ehemann, Chicago, Ill., assignor, by mesne assignments, to Argus Incorporated, a corporation of Delaware
Filed June 25, 1959, Ser. No. 822,810
4 Claims. (Cl. 88—28)

The present invention relates to slide projecting apparatus and more particularly to a slide changing device by which film transparencies commonly referred to as film slides may be moved into and out of projecting position.

Many types of slide changing devices are presently available. One common type of slide changing device has a relatively thin, elongated housing having at one end thereof a supply magazine projecting laterally from one side of the housing and a take-up magazine laterally projecting from the opposite side of the housing. A pair of slide-projecting openings are provided through which slides are projected one at a time. A slide-changing tongue member is reciprocally mounted within the housing for advancing a slide forwardly from the supply magazine to the slide projecting openings in a first vertical plane and then rearward from the latter openings to the take-up magazine for the most part in a second vertical plane parallel to the first plane. The slide changing device must thus be provided with means for laterally displacing the slide from one vertical plane to another. In one slide changing device, the means includes guide springs which engage the edge of a slide in the rearward movement of the slide toward the take-up magazine and deflect it into another vertical plane. This slide displacing means sometimes results in jamming of a slide due to the engagement of the slide with the sharp edges of the spring means rather than the flat changing device. In this and other slide changing devices of the type being described, springs used to deflect or move the slides toward the take-up magazine are subject to excessive wear and often become deformed or broken causing jamming of the slide changing device.

One of the objects of the present invention is to provide an improved slide changing device of the type above described where the parts thereof are so constructed and arranged that the change in the plane of movement of the slide is accomplished in an exceedingly simple and reliable manner which avoids jamming thereof. A related object of the invention is to provide a slide changing device wherein the means for displacing the slide is so designed that it cannot be readily deformed or broken, so that the useful life of the slide changing device is not impaired thereby. A still further related object of the present invention is to provide an improved slide changing device as just described where a slide is carried forwardly from the supply magazine to the slide projecting openings and then rearwardly to the take-up magazine in a single fore and aft movement of the slide-changing tongue member.

Another object of the present invention is to provide a slide-changing device as just described including slide displacing means which moves the slide into the proper slide return plane automatically as the slide is moved forwardly into position opposite the slide projecting openings. A related object of the invention is to provide a slide changing device where the slide displacing means just described initially engages and tilts the leading edge portion of an oncoming slide, and wherein means are provided for preventing passage of light past the edge of the slide as it is tilted opposite the slide projecting openings.

In accordance with one feature of the invention, a slide-changing tongue member is provided with a slide-receiving opening which holds the slide as it is advanced from the supply magazine to the slide projecting openings. Spring means preferably in the form of bowed spring metal strips are located at the supply projecting openings and, as the slide-changing tongue member is moved in position to bring the slide opposite the slide projecting openings, the spring means initially engage the leading edge portion of the slide and push the same into the slide return plane at the other side of the housing of the slide-changing device. When the slide-receiving opening of the tongue member is in registry with or centered with respect to the slide projecting openings, the entire slide is held in the slide return plane by the aforesaid spring means.

Adjacent the leading edge of the slide-receiving opening of the tongue member, a light masking means is provided behind which the leading edge portion of the slide passes during the tilting thereof, so that light does not pass around the edge of the slide during the tilting thereof. A lateral projection is provided at the leading edge of the slide-receiving opening of the tongue member which engages the leading edge of the slide and pulls the same rearwardly upon return or reverse movement of the tongue member, so as to carry the slide to the take-up magazine. Slide folding means are also provided for holding the slide in the slide return plane after the slide is moved away from the aforesaid spring means. The slide holding means most advantageously comprises guide projections extending respectively upwardly and downwardly from the internal bottom and top portions of the housing between the slide projecting openings and the take-up magazine.

Other features of the invention relate to various details of the elements in the slide-changing device and the relationship therebetween. These and other features, objects and advantages of the invention will become apparent upon making reference to the specification to follow, the claims and the drawings wherein:

FIG. 1 is a perspective view of the slide-changing device of the present invention;

FIG. 2 is an exploded view showing the housing part including the take-up magazine, and the slide-changing tongue assembly which is slidable in a guideway in the latter housing part;

FIG. 3 is a perspective view drawn to a reduced scale of the slide-changing tongue member forming the main part of the tongue assembly shown in FIG. 2, the figure showing the opposite side of the tongue member from that shown in the latter figure;

FIG. 4 is a perspective view of the housing part including the supply magazine;

FIG. 5 is a fragmentary, horizontal sectional view through the slide-changing device of the invention taken along section line 5—5 in FIG. 1 and with the slide-changing tongue member in position to receive a slide from the supply magazine;

FIG. 6 is a view corresponding to FIG. 5 with the slide-changing tongue member in a position where a slide carried thereby is being tilted into the plane of the slide return guideway;

FIG. 7 is a view corresponding to FIG. 5 showing the slide-changing tongue member as it is moved rearwardly into a position where a slide is being pushed into the take-up magazine;

FIG. 8 is a vertical transverse sectional view through the slide-changing device of the invention taken along section line 8—8 in FIG. 1, and showing the supply and take-up magazines and the slide-changing tongue member in a position where its slide-receiving opening is out of registry with the slide inlet opening opposite the supply magazine;

FIG. 9 is a view corresponding to FIG. 8 with the slide-receiving opening of the tongue member in registry with the slide inlet opening opposite the supply magazine;

FIG. 10 is a fragmentary, vertical longitudinal sectional view through the supply magazine taken along section line 10—10 in FIG. 8;

FIG. 11 is a vertical transverse sectional view through the slide-changing device of the invention, taken along section line 11—11 in FIG. 7;

FIG. 12 is an enlarged exploded sectional view of the parts shown in FIG. 11; and FIG. 13 is a vertical transverse sectional view through the slide-changing device of the invention, taken along section line 13—13 in FIG. 1.

Referring to FIG. 1 in particular, the slide-changing device of the present invention generally comprises a thin, elongated housing 2 having at one end thereof a supply magazine 4 projecting laterally from one side of the housing and a take-up magazine 6 laterally projecting from the other side of the housing. The housing further has intermediate the ends thereof a pair of aligned, slide-projecting openings 8—10 formed in opposite sides of the housing, and opposite the supply and take-up magazines, respectively, a slide inlet opening 12 and a slide outlet opening 14. A slide-changing tongue member 16 is reciprocally mounted in the housing 2 and, upon inward or forward movement thereof, carries the innermost slide of a horizontal stack or supply of film slides 18 in the supply magazine 4 from the slide inlet opening 12 to the slide-projecting openings 8—10, where the picture on the slide can be projected on a screen (not shown). Upon rearward or outward movement thereof, the slide-changing tongue member 16 carries the projected slide to the slide outlet opening 14 where it pushes the slide into the take-up magazine 6. Slide-changing devices now on the market comprise in general the elements just described. The unique features of the present invention will now be described in connection with a detailed description of the various elements of the slide-changing device.

The housing 2 is most advantageously made of a pair of synthetic plastic molded parts 2a and 2b. The housing part 2a includes the supply magazine 4 and is shown most clearly in perspective view in FIGS. 1 and 4. The housing part 2a has an outer generally rectangular wall 20 whose margins join inwardly extending longitudinal horizontal side walls 22—22 and vertical end walls 24—24. The longitudinal horizontal side walls 22—22 terminate in outwardly extending flanges 26—28 and the vertical end wall 24 adjacent the supply magazine terminates in an outwardly extending flange 30. All of the flanges 26, 28 and 30 of the housing part 2a have coplanar inner vertical surfaces.

Spaced horizontal ribs 32—32 are formed on the inside of the outer wall 20 and are spaced a small distance from the longitudinal side walls 22—22 at the rear end of the housing part 2a to form spring slide slots 34—34, the ends of the ribs being in the plane of the inner surfaces of the aforesaid flanges. Slidably disposed in the slots 34—34 are the straight outer ends 36—36 of a pair of horizontally extending spring metal strips 38—38. The intermediate or central portions 39—39 of the strips are respectively located immediately above and below the slide-projecting opening 8 and are bowed inwardly for reasons to be explained. The inner ends 40—40 of the strips are secured to the housing part 2a by any suitable manner, such as by hooking the same through narrow openings or slits in the outer wall 20 of the housing.

The supply magazine 4 of the housing part 2a may be molded integrally with the housing part 2a and includes longitudinally spaced vertical walls 41—42 forming guide walls for a vertically positioned supply of film slides 18. The floor of the magazine 4 is formed in part by inwardly extending horizontal wall portions 43—43, the inner ends of the walls 43—43 joining a U-shaped section 44 defining a chamber 45 for holding a coil spring or similar resilient means 46. The inner end portions of the horizontal walls 43—43 are slightly downwardly recessed (see FIG. 10) to form a slide space 47 which slidably receives a horizontal tongue 50 of a vertical pressure plate member 52. A slotted horizontal metal plate 54 is secured upon the horizontal walls 43—43 and defines the top of the slide space 47.

The horizontal tongue 50 has a depending lug 55 around which one end of the coil spring 46 passes, the spring drawing the vertical pressure plate member 52 inwardly against the slides so as to urge the same toward the slide inlet opening 12. The slotted plate 54 has a center slot 56 in which the upstanding neck portion 57 of the vertical pressure plate member 52 so that it may be grasped and pulled outwardly to enable the ready insertion of the slides 18 into the supply magazine 4.

The other housing part 2b in general has the same over-all size and shape as the housing part 2a. It has an outermost vertical wall 60 whose longitudinal margins join horizontal, inwardly extending side walls 62—62 and whose end margins terminate in inwardly extending vertical end walls 64—64. The longitudinal side walls 62—62 terminate in outwardly extending flanges 66—67 having inner vertical surfaces which are coplanar with the corresponding coplanar inner surfaces of the aforesaid flanges of the other housing part 2a. The inner surfaces of the flanges of the housing parts 2a and 2b are provided with complementary pins and sockets 68—70 which fix the position of the housing parts during assembly thereof. The flanges are permanently secured together by rivets 72 passing through aligned openings 74—75 in the flanges of the housing parts 2a and 2b, respectively. When the two housing parts are thus assembled, their respective slide-projecting openings 8 and 10 are in registry with one another so that beams of light can be passed therethrough to project the picture on the slide moved into slide-projecting position by the slide-changing tongue member 16.

The construction of the take-up magazine 6 forming part of the housing part 2b is identical to the construction of the supply magazine 4 associated with housing part 2a and will not be described in detail. Suffice it to say, however, it includes a vertical pressure plate member 52' which has a horizontal tongue 50' from which depends a lug 55' around which extends one end of the coil spring 46. The lower flanges 28 and 67 of the housing parts 2a and 2b are provided with aligned openings 76—78 through which the coil spring 46 passes between the U-shaped bottom portions of the supply end take-up magazines.

The inside of the housing part 2b is provided with a series of projections and steps for providing guideways for sliding movement of various internal parts of the slide change device. To this end, the vertical inner faces of the flanges 66—67 of the housing part 2b respectively join narrow horizontally extending wall surfaces 80 and 82 which terminate, respectively, in coplanar vertical wall surfaces 84 and 86 (see FIGS. 2 and 12). The surfaces 80—82 and 84—86 respectively form a tongue-receiving guideway which slidably receives the upper and lower ends 88 and 90 of the tongue member 16. The lower surface 82 has an offset portion 92 defining a stop shoulder 94 against which a corresponding shoulder 96 provided on the bottom of the tongue member abuts when the tongue member is in its fully inserted or forwardmost position within the housing 2. The rear end of the lower flange 67 of the housing part 2b has an upwardly extending portion 98 providing a stop shoulder 100 against which a shoulder 102 provided on the bottom of the tongue member 16 abuts when the tongue member is in its fully retracted or rearwardmost position.

The tongue member 16 is provided with a slide-receiving opening 104 intermediate the ends thereof, which opening is of generally rectangular shape and which is larger than the slide-projecting openings 8 and 10 of housing parts 2a and 2b. The slide-receiving opening 104 is sized to receive a standard sized rectangular film slide which commonly includes a cardboard frame 18a (FIG. 1) with a center window 18c within which the picture portion of the film transparency 18b is located.

When the tongue member 16 is in its fully inserted or forwardmost position, the slide-receiving opening 104 thereof is centered with respect to the slide-projecting openings 8 and 10, and the film containing window of the slide frame is then in registry with the margins of the slide-projecting openings 8 and 10. When the tongue member 16 is in its fully retracted or rearwardmost position, the slide-receiving opening 104 thereof is in registry with the slide inlet opening 12 associated with the supply magazine 4. It is apparent the slide inlet opening 12 is about the same size as the slide-receiving opening 104 of the tongue member.

The tongue member 16 in addition to its slide-carrying function also serves as a light masking-means. To this end, an opaque light-masking section 105 is provided ahead of the slide-receiving opening 104 which aids in covering the slide-projecting openings 8 and 10 when a slide has been moved away from the slide-projecting openings 8 and 10. If desired, the length of the light-masking section 105 of the tongue member may have a length approximately equal to the distance a slide is moved within the housing 2. However, this may result in a housing of an appreciable greater length than is necessary. Accordingly, associated with the tongue member 16 is a separate light-masking member 109 (which will be described in detail hereinafter) which enables a substantial reduction in the length of the light-masking section 105 of the tongue member 16.

The tongue member 16 is further provided with a forward vertical projection 110 flush with the forward vertical margin of the slide-receiving opening 104 and extending toward the side of the housing having the take-up magazine. The tongue member 16 also has a rear vertical projection 112 extending laterally from the same side of the housing as projection 110. The rear projection 112 is flush with the rear vertical margin of the slide-receiving opening 104. The forward projection 110 extends almost but not quite to the inner surface 60a of the outer wall 60 of the housing part 2b for reasons to be explained whereas the rear projection 112 may extend into sliding engagement with the surface 60a, although it is shown spaced a small distance therefrom. As will appear, the forward projection 110 engages the leading or forward edge of a slide and pushes the same rearward toward the take-up magazine 6 when the tongue member 16 is retracted or moved rearwardly. The rear projection 112 prevents the slide from slipping downward between the tongue and inner surfaces of the housing part 2b defining the outer side of a slide return guideway 114, should the slide changer be tilted rearwardly from the horizontal. Of course, when the slide-changing device is mounted in position on a projector, it will have a horizontal orientation as illustrated.

When the slide-receiving opening 104 of the tongue member is moved into position opposite the slide-projecting openings 8 and 10, the inwardly-bowed portions 39—39 of the spring metal strips 38—38 engage the upper and lower margins of the cardboard frame 18a then in the slide-receiving opening 104 of the tongue member 16 and push the slide into the slide return guideway 114.

The slide return guideway 114 is defined by a stepped portion on the inside surface of the housing part 2b, which stepped portion includes a narrow horizontal extending wall surface 116—118 respectively extending from the inner margins of the vertical wall surface 84 and 86. The wall surfaces 116 and 118 terminate in inwardly extending, vertical, coplanar wall surfaces 120—122. The wall surfaces 120 and 122, in turn, join narrow, horizontal surfaces 124—126 which provide a guideway which slidably receives the light-masking member 109. As will appear, the light-masking member 109 is also slidably received in the forward end portion of the slide return guideway 114. The horizontal surfaces 124 and 126 join the vertical inner surface 60a of the outer housing wall 60.

Extending inwardly from the innermost halves of the horizontal surfaces 116 and 118 between the slide-projecting opening 10 and the slide outlet opening 14 are vertical, slide-confining wall projections 128 and 130. The slide-confining projections 128 and 130 are spaced from the vertical wall surfaces 120 and 122 a distance slightly greater than the thickness of a film slide 18. These projections retain the slide in the slide return guideway 14 when it is moved from the slide-projecting openings 8 and 10 to the take-up magazine 6.

Molded integrally with the housing part 2b adjacent the slide outlet opening 14 are upper and lower longitudinally extending slide-guiding extensions 132 and 134. The slide-guiding extensions 132 and 134 project a small distance into the tongue-receiving guideway, and, to provide clearance for the movement of the tongue member, the latter is provided with vertically spaced, longitudinally extending grooves 136—138 (FIG. 3) which slidably receive the extensions 132 and 134. As seen most clearly in FIGS. 2 and 5–7, the slide-guiding extensions 132 and 134 have inclined vertical outer surfaces 136 and 138 which are located in the path of movement of a slide 18 moving in the slide return guideway 114 opposite the take-up magazine 6. The inclined surfaces 136 and 138 engage with and tilt the oncoming slide to move the same into the take-up magazine 6.

As previously indicated, associated with the tongue member 16 is a light-masking member 109 which is slidably disposed within the forward end portion of the housing part 2b. The light-masking member 109 has a generally rectangular body having a flat outer vertical wall surface 141 which makes sliding engagement with the inner surface 60a of the outer wall 60 of the housing part 2b. The upper and lower ends of the wall surface 141 join horizontal upper and lower shoulders 142—143 which slide along housing walls 124 and 126. The shoulders 142—143 join inwardly offset vertical wall surfaces 144 and 145 which respectively make sliding engagement with vertical wall surfaces 120 and 122. The upper and lower edges of the light-masking member 109 slidably engage the horizontal wall surfaces 116 and 118.

The member 109 has a rectangular recess 146 formed in the slide thereof opposite the side formed by the aforesaid wall surface 141, the recess 146 forming a rear vertical wall portion 147. The member 109 has a cut-away portion behind the wall portion 147 which provides a thin lip or tongue 148.

The recess 146 of the light-masking member 109 also provides a vertical projecting wall 149 at the forward end thereof which rides along the outer surfaces of the ribs 32—32 on the housing part 2a. The member 109 is movable from a forwardmost position, where the projecting wall 149 abuts the forward end wall 64 of the housing part 2b and the member 109 is located beyond the slide-projecting openings 9 and 10 to a rearwardmost position where the member 109 covers the openings 8 and 10.

The light-masking member 109 is moved between the aforesaid extreme positions by a laterally projecting vertical extension 151 at the forward end of the tongue member which slides in the recess 146 of the member 109 between the rear and front vertical walls 147 and 149 thereof. It can be seen that the member 109 will be moved into position to cover the slide-projecting openings as the vertical extension 151 of the tongue member 16 engages the rear vertical wall 147 of the member 109. When the member 109 is moved to the aforesaid rearwardmost position, the slide-receiving opening 104 of the tongue member is in registry with the slide inlet opening 12 opposite the supply magazine 4. The member 109 is moved back to its forwardmost position to uncover the slide-projecting openings when the vertical extension 151 of the tongue member is moved opposite the forward vertical wall 149 thereof. As previously indicated, when the member 109 is in the aforesaid forward-most position, the slide-receiving opening 104 of the tongue member is centered with respect to the slide-receivings 8 and 10.

The operation of the slide-changing device of the invention is as follows: With the tongue member 16 in its fully retracted position illustrated in FIG. 5, the inwardly spring urged plate member 52 will force the innermost slide 18 into the slide-receiving opening 104. As previously indicated, with the tongue member in this position, the light-masking member 109 will be in its rearward-most position where it covers the slide-projecting opening 10. Next, the tongue member 16 is moved inwardly to bring the vertical extension 151 of the tongue member against the forwardmost vertical wall 149 of the light-masking member 109. In this position of the tongue member, the vertical projection 110 thereof at the forward edge of the slide-receiving opening 104 is adjacent the rear vertical wall portion 147 of the member 109, and the lip 148 thereof projects rearwardly beyond the vertical tongue projection 110 into the field of the slide-receiving opening 104. Further inward movement of the tongue member 16 will bring the leading edge of the slide-receiving opening 104 into a position where the bowed portions 39—39 of the spring metal strips 38—38 engage the leading edge of the film slide and tilt it toward the slide-return guideway, as shown in FIG. 6. The leading edge of the slide is then behind the portion of the lip 141 projecting beyond the vertical projection 110 of the tongue member, so that passage of light around the tilted slide is prevented. When the slide-receiving opening 104 of the tongue member is substantially centered with respect to the slide-projecting openings 8—10, the spring metal strips 38—38 have moved the entire slide into the slide-return guideway 114. After projection of the picture involved, the tongue member is pulled rearwardly to bring the slide member in the space between the slide guiding projections 128—30, where the slide leaves the spring strips 38—38. From this point on, the slide is kept in the slide return guideway by the projections 128—130 until the slide is moved into the take-up magazine 6. As previously indicated, return movement of the slide is effected by the vertical projection 110 at the forward end of the tongue member 16 which engages the forward or leading edge of the slide and pushes it into the take-up magazine in the manner previously explained.

The present invention has thus provided a slide-changing device of exceedingly simple construction where a slide is moved into projecting position from the supply magazine, and then into the take-up magazine by a single fore and aft motion of the tongue member. Also, the slide is shifted into the plane of the slide-return guideway by the simple and reliable expedient of the bowed spring metal strips 38—38. At no time, therefore, does the slide engage the sharp edges of a spring. The spring metal strips are subject to relatively small forces, so that the spring metal strips last indefinitely. The slide-changing device is otherwise substantially jam-proof.

It should be understood that numerous modifications may be made in the preferred form of the invention above described without deviating from the broader aspects of the invention.

I claim:

1. In a slide-changing device including a housing having a laterally facing inlet slide opening in one side of the housing and a slide outlet opening in the same section of the housing but on the opposite side thereof, aligned laterally facing slide-projecting openings on opposite sides of another section of the housing, a first guideway in said housing extending between said slide inlet and the slide-projecting opening on the same side of the housing, a slide return guideway parallel to said first guideway and extending between said slide outlet and the slide-projecting opening on the same side of the housing, a slide-carrying tongue slidably mounted in said first guideway and projecting from said housing, said tongue having a slide-receiving opening which, upon forward movement of said tongue, is moved from a slide-receiving position in registry with said slide inlet opening to a slide-projecting position in registry with said slide-projecting openings, and means for urging the slide through said slide inlet opening into the slide-receiving opening of said tongue when the latter is in said slide-receiving position, the improvement comprising spring means on said housing adjacent said first guideway and opposite the adjacent slide-projecting opening positioned to contact the margin of a slide in the slide-receiving opening of said tongue and push the same into the slide return guideway as said slide-receiving opening is moved opposite said slide-projecting openings, and light masking means connected to said tongue adjacent the forward end of said slide-receiving opening thereof behind which light masking means the edge of the slide is received as said spring means initially engages and tilts the forward end thereof into said slide return guideway.

2. In a slide-changing device including a housing having a laterally facing inlet slide opening in one side of the housing and a slide outlet opening in the same section of the housing but on the opposite side thereof, aligned laterally facing slide-projecting openings on opposite sides of another section of the housing, a first guideway in said housing extending between said slide inlet and the slide-projecting opening on the same side of the housing, a slide return guideway parallel to said first guideway and extending between said slide outlet and the slide-projecting opening on the same side of the housing, a slide-carrying tongue slidably mounted in said first guideway and projecting from said housing, said tongue having a slide-receiving opening which, upon forward movement of said tongue, is moved from a slide-receiving position in registry with said slide inlet opening to a slide-projecting position in registry with said slide-projecting openings, and means for urging the slide through said slide inlet opening into the slide-receiving opening of said tongue when the latter is in said slide-receiving position, the improvement comprising spring means on said housing adjacent said first guideway and opposite the adjacent slide-projecting opening positioned to contact the margin of a slide in the slide-receiving opening of said tongue and push the same into the slide return guideway as said slide-receiving opening is moved opposite said slide-projecting openings, said spring means comprising at least one longitudinally extending inwardly bowed strip of spring metal whose ends are attached to said housing side on opposite sides of the associated slide-projecting opening, said housing having a longitudinal guideway in which one end of the strip is mounted for longitudinal movement, the intermediate portion of each of said strips being bowed inwardly so as to extend into said slide return guideway when the slide-receiving opening of the tongue is opposite said slide-receiving openings, and light masking means connected to said tongue adjacent the forward end of said slide-receiving opening thereof behind which light masking means the forward edge of the slide is received as said spring means initially engages and tilts the forward end thereof into said slide return guideway.

3. In a slide changing device including a housing having a slide inlet and a slide outlet opening at the rear end of the housing, a pair of oppositely facing aligned slide-projecting openings formed in opposite sides of said housing at a point between the opposite ends thereof, a tongue-receiving guideway between said slide inlet opening and the slide-projecting opening on the same side of the housing, and a slide return guideway parallel to said tongue-receiving guideway and extending between said slide outlet opening up to and beyond the slide-projecting opening on the same side of the housing, the improvement comprising a tongue assembly having a main body member slidable in said tongue-receiving guideway and having a light masking section at the forward end thereof, a slide-receiving opening adjacent said light masking section, and a rear section which projects from said rear housing end where it may be grasped for reciprocation so as to move said slide-receiving opening between a position where it is in registry with said slide inlet opening and a position where it is in registry with said slide-projecting openings, said tongue assembly having a light masking member slidable in said slide return guideway between the slide-projecting opening and the forward end of said housing, means on the light masking section of said main body member for engaging said light masking member when positioned in the forward end of said housing and drawing the same over said slide-projecting openings upon rearward movement of the main body member, and for engaging said light masking member to push the same into the forward end of the housing when the main body member has been moved forwardly in a position which brings the slide-receiving opening thereof adjacent said slide-projecting openings, and said light masking member having a light masking lip rearwardly extending at the rear end thereof which extends over the rear end portion of said slide-receiving opening of the main body member when the latter is pushing it forward, and means adjacent said slide-projecting openings for engaging a slide in the slide-receiving opening of said main body member as the latter is moved opposite the slide-projecting openings and tilting into the slide return guideway, the leading tilted edge of the slide passing behind said projecting lip of said light masking member to mask the passage of light through the slide-projecting openings as the slide member is being tilted into the slide return guideway.

4. In a slide-changing device including a housing having a slide inlet and a slide outlet opening at the rear end of the housing, a pair of oppositely facing aligned slide-projecting openings formed in opposite sides of said housing at a point between the opposite ends thereof, a tongue-receiving guideway between said slide inlet opening and the slide-projecting opening on the same side of the housing, and a slide return guideway parallel to said tongue-receiving guideway and extending between said slide outlet opening up to and beyond the slide-projecting opening on the same side of the housing, the improvement comprising a tongue assembly having a main body member slidable in said tongue-receiving guideway and having a light masking section at the forward end thereof, a slide-receiving opening adjacent said light masking section, and a rear section which projects from said rear housing end where it may be grasped for reciprocation so as to move said slide-receiving opening between a position where it is in registry with said slide inlet opening and a position where it is in registry with said slide-projecting openings, said tongue assembly having a light masking member slidable in said slide return guideway between the slide-projecting opening and the forward end of said housing, means on the forward end of said light masking section of said main body member for engaging a rear end portion of said light masking member when positioned in the forward end of said housing and drawing the same over said slide-projecting openings upon rearward movement of the main body member and for engaging a forward end portion of said light masking member to push the same into the forward end of the housing when the main body member has been moved forwardly in a position which brings the slide-receiving opening thereof adjacent said slide-projecting openings, and said light masking member having a light masking lip rearwardly extending at the rear end thereof which extends over the rear end portion of said slide-receiving opening of the main body member when the latter is pushing it forward, and means adjacent said slide-projecting openings for engaging a slide in the slide-receiving opening of said main body member as the latter is moved opposite the slide-projecting openings and tilting it into the slide return guideway, the leading tilted edge of the slide passing behind said projecting lip of said light masking member to mask the passage of light through the slide-projecting openings as the slide member is being tilted into the slide return guideway.

References Cited in the file of this patent

UNITED STATES PATENTS

| | | |
|---|---|---|
| 1,159,681 | Kastner | Nov. 9, 1915 |
| 2,513,102 | Parlini | June 27, 1950 |
| 2,549,898 | Fish | Apr. 24, 1951 |
| 2,756,630 | Goldberg | July 31, 1956 |
| 2,844,895 | Brumberger | July 29, 1958 |
| 2,893,146 | Geiger | July 7, 1959 |

FOREIGN PATENTS

| | | |
|---|---|---|
| 1,170,238 | France | Sept. 22, 1958 |